United States Patent [19]
Simmons, Sr.

[11] 3,970,789
[45] July 20, 1976

[54] TELEPHONE SERVICE CONTROL DEVICE

[76] Inventor: Ryden R. Simmons, Sr., 1342 Longfellow St., NW., Washington, D.C. 20011

[22] Filed: Jan. 15, 1975

[21] Appl. No.: 541,201

[52] U.S. Cl. ............................. 179/1 HS; 179/2 TC
[51] Int. Cl.² ........................................ H04M 1/66
[58] Field of Search ............... 179/2 TC, 2 C, 1 HS, 179/5 R, 178, 161; 58/152 T; 340/309.2, 309.4, 309.6; 200/35 H, 38 F, 36, 37 A, 39 R, 38 FB

[56] References Cited
UNITED STATES PATENTS

| | | | |
|---|---|---|---|
| 2,653,195 | 9/1953 | Zimmermann | 179/1 HS |
| 3,296,382 | 1/1967 | Klumb et al. | 179/1 HS |
| 3,472,966 | 10/1969 | Simmons | 179/2 TC |

*Primary Examiner*—Kathleen H. Claffy
*Assistant Examiner*—E. S. Kemeny
*Attorney, Agent, or Firm*—Sughrue, Rothwell, Mion, Zinn & Macpeak

[57] ABSTRACT

A telephone service control device of multi-purpose character includes a housing mounted on a telephone set. Within the housing is an operating mechanism which is connected with the telephone circuit plungers to accomplish various functions according to accessory devices attached to the unit. The mechanism includes a central shaft and a plate, and levers for controlling the movement of the plate in response to action of the accessories.

2 Claims, 10 Drawing Figures

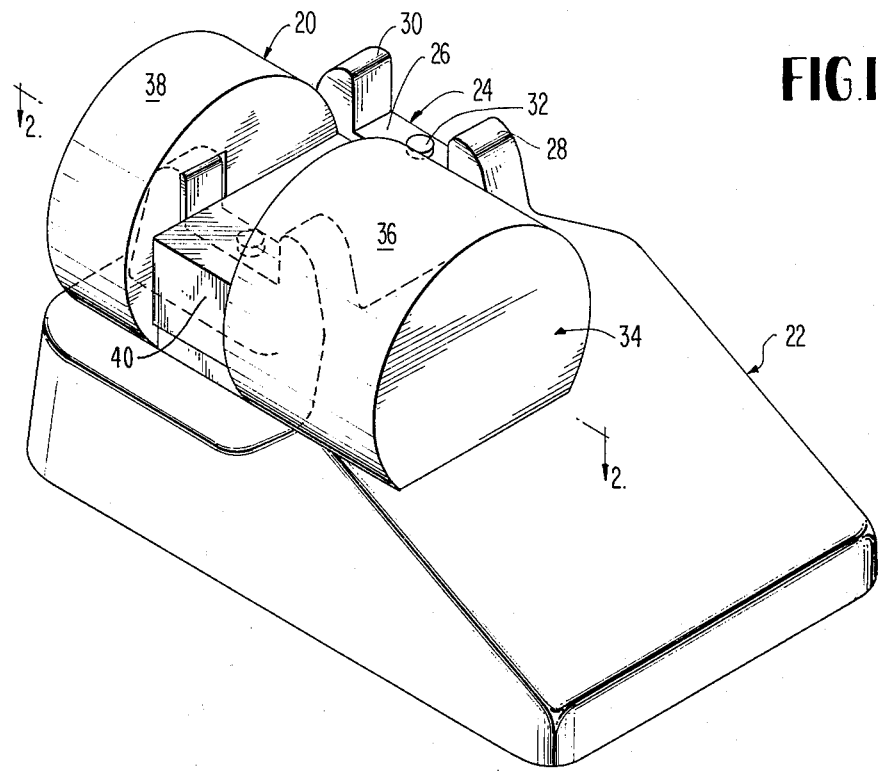
FIG.1
FIG.3
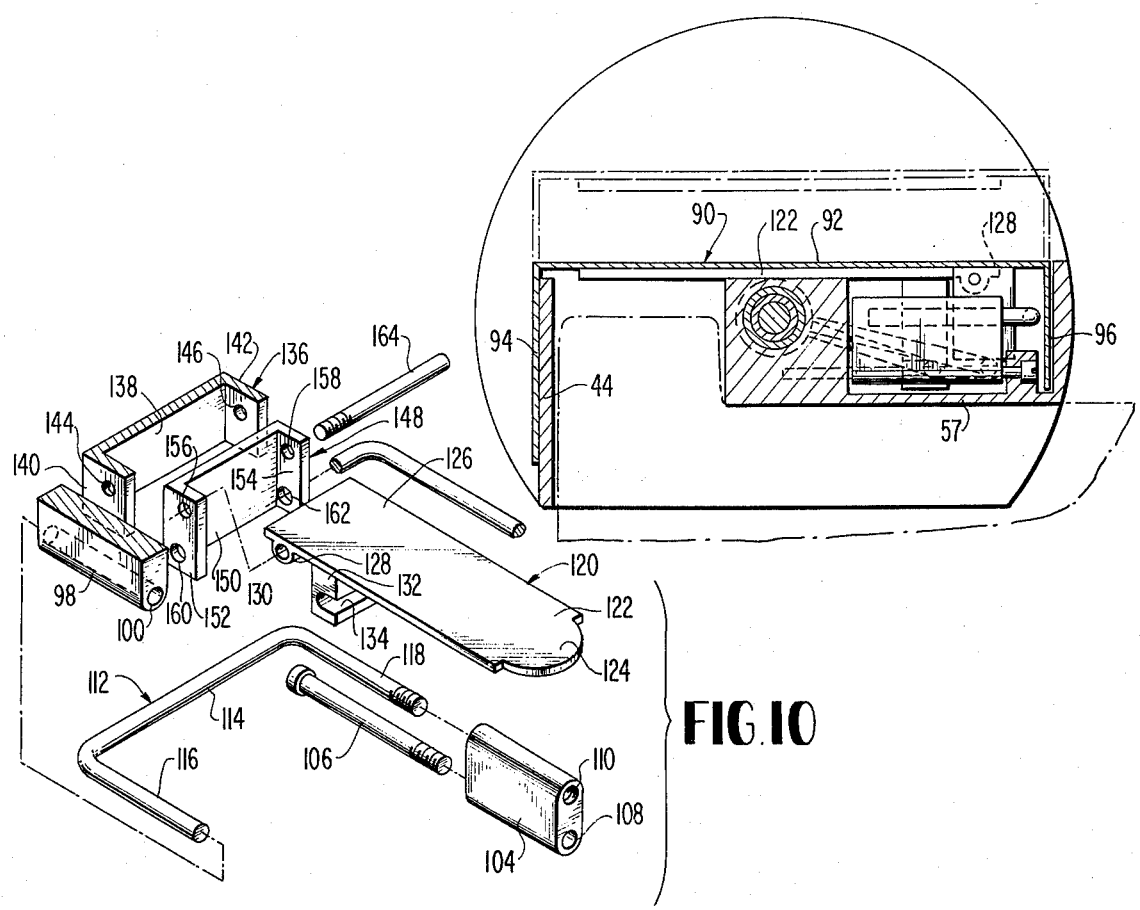
FIG.10

TELEPHONE SERVICE CONTROL DEVICE

BACKGROUND OF THE INVENTION:

1. Field of the Invention:

This invention relates to a new and novel item for attachment to a telephone set to accomplish various functions, such as limitation of the duration of telephone calls.

2. Statement of Prior Art:

In my prior U.S. Pat. No. 3,472,966, a telephone attachment for the interruption of a call at the conclusion of a specified time, is disclosed.

SUMMARY OF THE INVENTION:

This invention relates to a multi-function service control attachment for a telephone set. As detailed below, the device may be employed in imposing a limitation on the duration of a call, or in many other fashions.

It is an important feature of the invention that it is operable without connection with the telephone electrical circuit. Thus, it does not interfere with normal use of the telephone.

The apparatus may be adapted to provide a signal at the conclusion of a selected time after a call is initiated.

Among additional functions envisaged for the unit by the application of the state of the art accessory items are: (1) the attachment of a voice dialing accessory permitting lifting of the receiver and dialing without touching of the telephone; (2) identification of specific extensions in use through a code index; (3) the conversion of a telephone system to an intercommunications system; (4) permitting the device to render an audible signal at specified time intervals, and (5) the provision of a visible call timer.

Other and further objects and advantages of the invention will become apparent to those skilled in the art from a consideration of the following specification when read in conjunction with the annexed drawings.

BRIEF DESCRIPTION OF THE DRAWING:

FIG. 1 is a perspective view of a telephone set with a service device according to this invention in place thereon;

FIG. 3 is a transverse cross-section on line 3—3 of FIG. 2;

FIG. 10 is a disassembled perspective view of certain components.

Figure 2:
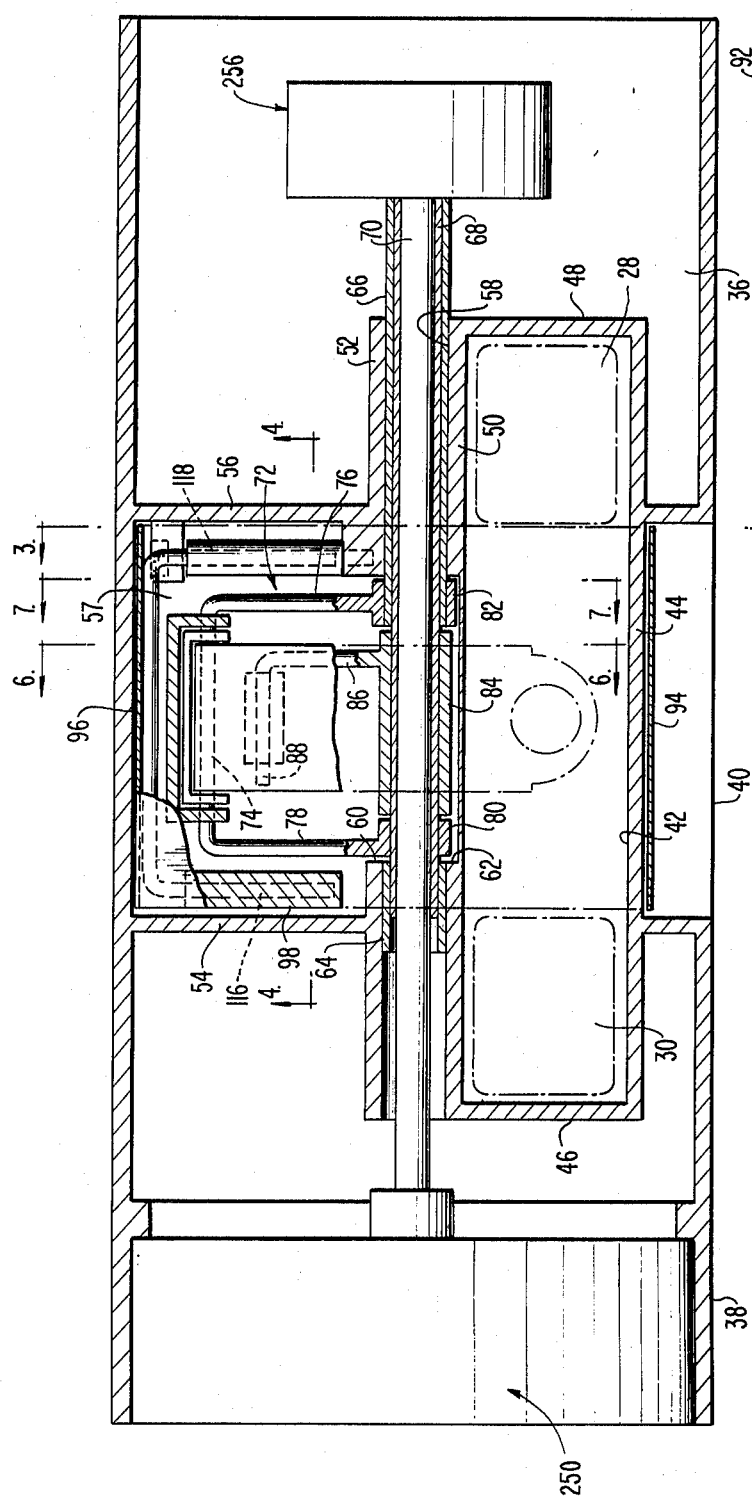
FIG. 2 is an enlarged sectional view taken substantially on line 2—2 of FIG. 1, looking in the direction of the arrows.

DESCRIPTION OF A PREFERRED EMBODIMENT:

Referring to the drawings in more detail, the environment of use of this device is shown in FIG. 1. Here, the device 20 is operatively mounted on a telephone set 22. The set 22 has a hand-set cradle 24 with cradle bases 26 and forward and rear cradle sides 28, 30. Circuit plungers 32 extend through the cradle bases and are depressable to break the telephone circuit.

The device 20 includes a housing 34 having a forward section 36, an aft section 38, and a central section 40. These sections are so formed that a handset (not shown) may rest in normal position with the unit in place. The forward and aft sections house the driving or accessory components described below, while the central section contains the actuating mechanism hereof.

As best seen in FIG. 2, the central section 40 has an open chamber 42 defined by surrounding chamber walls 44, 46, 48, and an inner division wall 50. The wall 50 has a longitudinally extending barrel section 52 formed integrally therewith, and this in turn is joined to transverse walls 54, 56. A floor 57 also joins these walls. The barrel section 52 has a bore 58 extending therethrough and is centrally cut away at 60. Opposite the cut-away 60, the division wall 50 is of reduced thickness to provide a clearance area 62. It will be observed that the chamber 42 permits the housing to seat over the cradle sides 28 and 30.

Mounted within the bore 58 of the barrel are first bearing sleeves 64 and 66. Telescoped within these is a second bearing sleeve 68, and an elongated main shaft 70 extends through the latter and projects into the forward and aft sections.

A bail 72 has bight portion 74 and arms 76, 78. At the ends of the arms, rings 80, 82 are formed. The ring 82 is fixed to the sleeve 66 for movement therewith. The ring 80 is loosely mounted about the sleeve 68 and does not rotate with it. Between the rings 80 and 82 and also secured to the second bearing sleeve 68 is a carrier sleeve 84 which moves with the sleeve 68. On the sleeve 84 is an outward lever 86 with a perpendicular foot portion 88, the function of which appears below.

Figure 5:
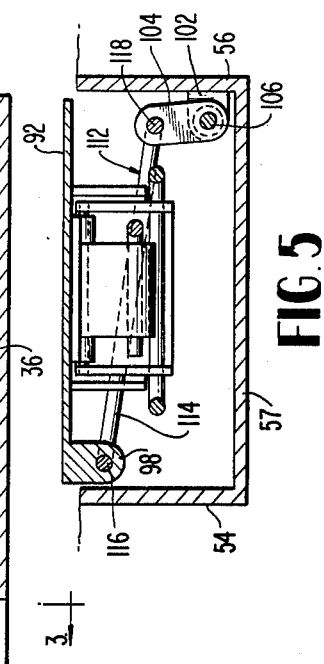
FIG. 5 is a view similar to FIG. 4 but illustrating certain operating components in alternate positions.
Figure 4:
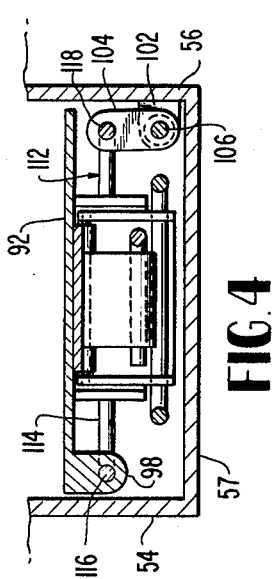
FIG. 4 is another section view, taken on line 4—4 of FIG. 2, looking in the direction of the arrows.
Figure 6:
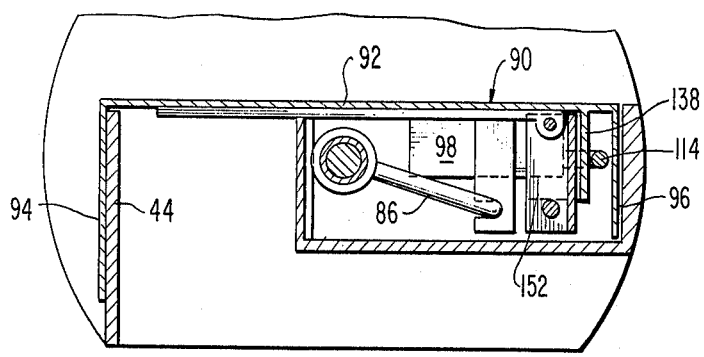
FIG. 6 is a sectional view on line 6—6 of FIG. 2.
Figure 7:
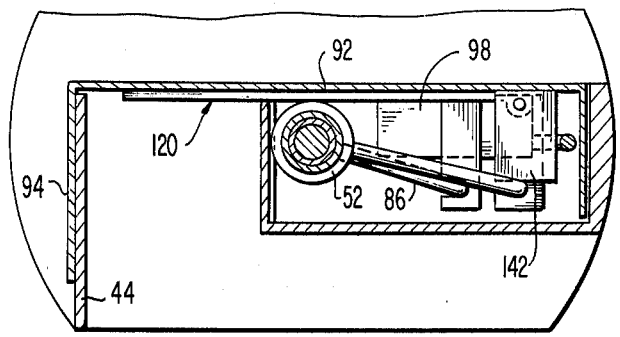
FIG. 7 is yet another sectional view, here taken on line 7—7 of FIG. 2.
Figure 8:
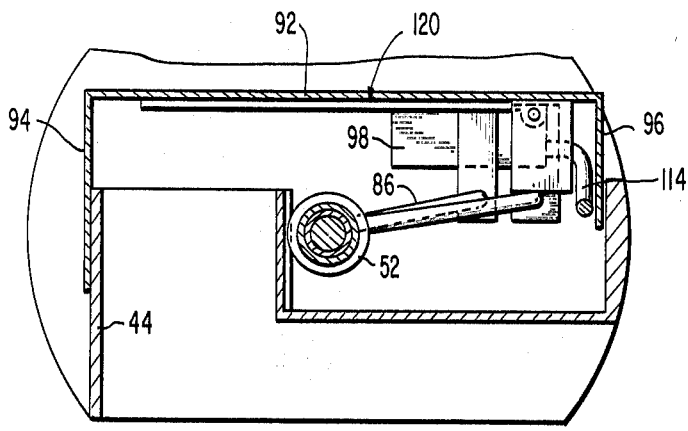
FIG. 8 is a view like FIG. 7 but showing the mechanism in intermediate position.
Figure 9:
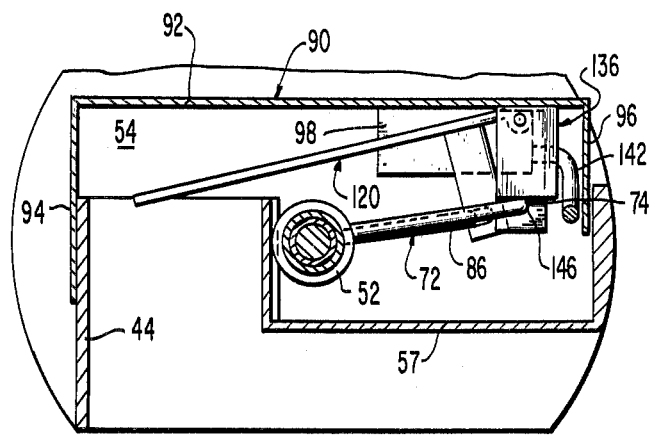
FIG. 9 is patterned on FIGS. 7 and 8 but shows the fully elevated condition of the lift frame, but with circuit plungers depressed by the tilt lever 120.

A lift frame 90 (FIGS. 3 and 6–9) has a horizontal top 92, a vertical side plate 94 which abuts slidably against the wall 44 of the central section, and an inner vertical side plate 96. Depending from the top 92 is a block 98 having a bore 100 formed therein. The block 98 is located adjacent to transverse wall 54. Projecting from the transverse wall 56 is a lug 102 (FIGS. 4 and 5) to which a bearing block 104 is pivotally secured by a screw 106 which extends into a lower opening 108 thereof. A second upper opening 110 is also provided. A pivot lift bail 112 has a bight portion 114 and side arms 116, 118. The side arm 116 is pivotally engaged in the bore 100 of the block 98, while the side arm 118 is similarly mounted, loosely threadedly connected in the upper opening 110 of the bearing block 104. Thus, the lift frame 90 is secured to the service device housing for limited vertical movement from a fully depressed position (FIG. 4) to an elevated position (FIG. 5). FIGS. 6–9 illustrate various operating positions.

Lifting of the frame 90 and the other operations include a tilt lever 120 comprising an elongated plate 122 having a rounded end 124 which is positioned over the circuit plunger of the set. The opposite end 126 of the plate has a depending boss 128 with a transverse passageway 130 therein. Also depending from the plate adjacent the end 126 is a leg member 132 having a forwardly opening slot 134. A U-frame 136 depends from the top 92 of the lift frame, and has a cross member 138 and ends 140, 142.

Nested in the U-frame 136 is a control member 148 for the tilt lever 120, the control member also being of U-shape and having a back 150 and end frames 152, 154. These have upper and lower co-aligned holes 156, 158, and 160, 162 formed therein. The boss 128 of the lever fits between the end frames, and its passageway 130 is aligned with the upper holes 156 and 158. A pin 164 is extended through the passageway 130, the holes 144, 146, and the holes 156, 148, whereby the lever is pivotally secured to the control member and the U-frame is locked to the control member. The pin is threaded at its end for engagement in the hole 144. It will be observed that this places the lower holes 160 and 162 at a position below the ends of the U-frame.

Thus, upon rotation of the bearing 66, the bail is turned to effect upward or downward movement of the lift frame according to the direction of such rotation.

The foot portion 88 of the lever 86 is engaged pivotally in the slot 134 of the leg member. Upon rotation of the shaft 70 and second bearing sleeve 68 the tilt lever end is also suitably moved.

It will be appreciated that, by movement of either of the bearings 64, 66, or the bearing sleeve 68 independently of one another, it would be possible to effect different movements of the lift frame and the tilt lever.

Mounted within the after housing section 38 is a motor 250 which may be electrical, spring-powered, or of any other suitable type. This motor provides an energy source to rotate the shaft 70 and/or the aforesaid sleeves. The motor is connected to the shaft in the aft housing section. On the opposite end of the shaft, in the forward section 36 of the housing, a control in the form of an accessory 256 is mounted in accordance with the use to which the device is to be adapted. By way of example, the accessory 256 may include a timing mechanism. In such circumstances, at a predetermined interval following lifting of the telephone set, the shaft is rotated applying power to the accessory, in turn operating the bearing 66 to raise the bail 72, then operating the sleeve 68 as needed to depress the plunger and break the telephone circuit. It will be appreciated that other and different arrangements could easily be accomplished by substitution of different mechanisms for the accessory 256. In such instances, the device could be timed to lift the receiver at a specific time or to accomplish the other objectives set forth herein above.

I claim:

1. A telephone service device for use with a telephone set having a circuit plunger, comprising:
   a housing adapted to seat on the telephone set over at least one circuit plunger;
   a rotatable shaft operatively mounted within said housing, and a motor and a control accessory means mounted on opposite ends of said shaft;
   the shaft having a series of sleeves journaled thereon and the shaft being adapted to drive at least one of said sleeves;
   a lift frame extending partially over the circuit plunger and movably secured to the housing;
   lever means secured to said one of said sleeves, the lever means including a pivotal tilt lever, said tilt lever being moved by said one of said sleeves responsive to rotation of said shaft and contacting the circuit plunger to depress the same, and contacting the lift frame to vertically move said frame; and
   a bail secured to another of the sleeves and to the lift frame to effect upward or downward movement of the lift frame responsive to rotation of the sleeve.

2. The invention of claim 1, wherein: the sleeves include bearing means connecting to said shaft to drive said accessory means.

* * * * *